(12) United States Patent
Kim et al.

(10) Patent No.: US 9,751,231 B2
(45) Date of Patent: Sep. 5, 2017

(54) POLARIZING FILM CUTTING KNIFE AND METHOD OF MANUFACTURING POLARIZING PLATE USING THE SAME

(71) Applicant: Samsung Display Co., Ltd., Yongin, Gyeonggi-Do (KR)

(72) Inventors: Dong-Wook Kim, Asan-si (KR); Hyun-Hun Jang, Asan-si (KR); Sung-Ho Kang, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 221 days.

(21) Appl. No.: 14/507,598

(22) Filed: Oct. 6, 2014

(65) Prior Publication Data

US 2015/0101166 A1 Apr. 16, 2015

(30) Foreign Application Priority Data

Oct. 11, 2013 (KR) .................. 10-2013-0121046

(51) Int. Cl.
*B26D 1/00* (2006.01)
*B29D 11/00* (2006.01)
(Continued)

(52) U.S. Cl.
CPC ...... *B26D 1/0006* (2013.01); *B29D 11/00644* (2013.01); *B26D 2001/002* (2013.01);
(Continued)

(58) Field of Classification Search
CPC ............ B26D 1/0006; B26D 2001/002; B26D 2001/0053; B26D 2001/004; B26D 1/015; B26D 1/025; B26D 1/045; B26D 1/455; B26D 1/565; B26D 1/585; B26D 1/605; B29C 2793/0009; B29C 2793/0036; B29C 2793/0063; B29D 11/00644; B29L 2011/0066; G02B 5/30; G02B 5/3033–5/305; Y10T 29/4973; Y10T 29/49764; Y10T 29/49769; Y10T 29/49771; Y10T 29/49789;
(Continued)

(56) References Cited

U.S. PATENT DOCUMENTS

| | | | | |
|---|---|---|---|---|
| 4,844,772 A | * | 7/1989 | Sumi .................... | B26D 1/0006 156/497 |
| 2002/0085146 A1 | * | 7/2002 | Miyazaki .......... | G02F 1/133536 349/96 |

(Continued)

FOREIGN PATENT DOCUMENTS

| | | |
|---|---|---|
| JP | 2003-048195 | 2/2003 |
| JP | 2009-154252 | 7/2009 |

(Continued)

OTHER PUBLICATIONS

Translation of JP 2009220262 A, generated Nov. 8, 2016.*

*Primary Examiner* — Christopher Besler
*Assistant Examiner* — Matthew P Travers
(74) *Attorney, Agent, or Firm* — Innovation Counsel LLP

(57) ABSTRACT

A polarizing film cutting knife includes a body portion extending in a first direction, and a knife portion connected to the body portion. The knife portion includes a first surface and a second surface. The first and second surfaces form a first angle. The first angle is about 21.8 to 22.2 degrees.

10 Claims, 4 Drawing Sheets

(51) Int. Cl.
  *B29L 11/00* (2006.01)
  *G02B 5/30* (2006.01)
(52) U.S. Cl.
  CPC ............ *B26D 2001/006* (2013.01); *B26D 2001/0053* (2013.01); *B29L 2011/0066* (2013.01); *G02B 5/3033* (2013.01); *Y10T 29/49764* (2015.01); *Y10T 83/929* (2015.04)
(58) Field of Classification Search
  CPC .......... Y10T 29/49796; Y10T 83/0448; Y10T 83/0476; Y10T 83/05; Y10T 83/0515; Y10T 83/0524; Y10T 83/0572; Y10T 83/0605
  See application file for complete search history.

(56) References Cited

U.S. PATENT DOCUMENTS

| | | | | |
|---|---|---|---|---|
| 2005/0011861 A1* | 1/2005 | Choo | ............... | C23C 16/26 216/62 |
| 2005/0016670 A1* | 1/2005 | Kanbara | ............... | B32B 37/182 156/257 |
| 2005/0056127 A1* | 3/2005 | Yamabuchi | ............... | C03B 33/07 83/13 |
| 2005/0153079 A1* | 7/2005 | Hieda | ............... | B32B 27/08 428/1.2 |
| 2007/0013858 A1* | 1/2007 | Yamabuchi | ............... | G02F 1/133351 349/153 |
| 2007/0211335 A1* | 9/2007 | Ikeda | ............... | G02B 5/3083 359/487.05 |
| 2008/0164627 A1* | 7/2008 | Jeong | ............... | B26F 1/40 264/1.34 |
| 2009/0078366 A1* | 3/2009 | Endo | ............... | B29C 35/10 156/250 |
| 2009/0098789 A1* | 4/2009 | Endo | ............... | B26F 1/00 445/24 |
| 2010/0073604 A1* | 3/2010 | Okuyama | ............... | B29D 11/00644 349/75 |
| 2010/0186890 A1* | 7/2010 | Kitada | ............... | B32B 38/185 156/256 |
| 2010/0227104 A1* | 9/2010 | Yokouchi | ............... | B29C 65/5042 428/41.8 |
| 2010/0236702 A1* | 9/2010 | Sugimoto | ............... | B32B 37/182 156/257 |
| 2010/0282406 A1* | 11/2010 | Kitada | ............... | B29D 11/0073 156/256 |
| 2010/0288432 A1* | 11/2010 | Kitada | ............... | B32B 38/0004 156/248 |
| 2010/0300611 A1* | 12/2010 | Yamamoto | ............... | B32B 7/06 156/248 |
| 2011/0005656 A1* | 1/2011 | Kitada | ............... | B32B 41/00 156/64 |
| 2011/0043733 A1* | 2/2011 | Suzuki | ............... | C09J 135/04 349/96 |
| 2011/0083789 A1* | 4/2011 | Nakazono | ............... | B32B 41/00 156/64 |
| 2011/0104423 A1* | 5/2011 | Kitada | ............... | B32B 37/02 428/41.8 |
| 2012/0028067 A1* | 2/2012 | Izaki | ............... | B32B 38/0004 428/542.8 |
| 2012/0055608 A1* | 3/2012 | Kitagawa | ............... | B26D 1/151 156/64 |
| 2012/0056340 A1* | 3/2012 | Kitagawa | ............... | B32B 41/00 264/1.34 |
| 2012/0071058 A1* | 3/2012 | Hirata | ............... | G02F 1/133528 445/24 |
| 2012/0080145 A1* | 4/2012 | Hirata | ............... | G02F 1/1303 156/249 |
| 2012/0094410 A1* | 4/2012 | Hirata | ............... | G02F 1/133528 438/30 |
| 2012/0097325 A1* | 4/2012 | Hada | ............... | B32B 38/10 156/249 |
| 2012/0103532 A1* | 5/2012 | Hada | ............... | B32B 37/226 156/543 |
| 2012/0211153 A1* | 8/2012 | Koshio | ............... | B26D 1/185 156/256 |
| 2013/0070194 A1* | 3/2013 | Hada | ............... | G02F 1/1303 349/187 |
| 2015/0047766 A1* | 2/2015 | Yura | ............... | G02B 5/3033 156/64 |

FOREIGN PATENT DOCUMENTS

| | | | |
|---|---|---|---|
| JP | 2009220262 A | * | 10/2009 |
| KR | 20-285815 | | 8/2002 |
| KR | 100958415 B1 | | 5/2010 |
| KR | 101256789 B1 | | 4/2013 |
| KR | 101272366 B1 | | 5/2013 |

* cited by examiner

POLARIZING FILM CUTTING KNIFE AND METHOD OF MANUFACTURING POLARIZING PLATE USING THE SAME

This application claims priority under 35 U.S.C. §119 to Korean Patent Application No. 10-2013-0121046, filed on Oct. 11, 2013, the disclosure of which is incorporated by reference herein in its entirety.

BACKGROUND

1. Field

Exemplary embodiments relate to a polarizing film cutting knife and a method of manufacturing a polarizing plate using the polarizing film cutting knife.

More particularly, exemplary embodiments relate to a polarizing film cutting knife to cut a polarizing film for a display apparatus and a method of manufacturing a polarizing plate using the polarizing film cutting knife.

2. Description of the Related Technology

Generally, a liquid crystal display (LCD) apparatus has various advantageous characteristics such as thin thickness, lightweight, low power consumption, etc. Thus, the LCD apparatus has been widely used in a monitor, a notebook personal computer, a cellular phone, etc. The LCD apparatus includes an LCD panel displaying an image by using an optical transmissivity of liquid crystal and a backlight assembly disposed under the LCD panel to provide light to the LCD panel.

The liquid crystal display apparatus applies a voltage to specific molecular arrangement configured to change the molecular arrangement. The liquid display apparatus displays an image using changes of optical property (for example, birefringence, rotatory polarization, dichroism and light scattering) of a liquid crystal cell according to the changes of the molecular arrangement.

SUMMARY

The liquid crystal display apparatus includes upper and lower polarizing plates to control the molecular arrangement. The upper and lower polarizing plates may be formed by cutting a polarizing film from a polarizing film roll. At this time, particles may be formed at a cutting plane of the polarizing film and particles may be attached to a knife for cutting the polarizing film, so that quality of the polarizing plates and efficiency of process may be deteriorated.

One or more exemplary embodiment provides a polarizing film cutting knife capable of improving a cutting plate of a polarizing film and capable of simplifying a manufacturing process.

One or more exemplary embodiments also provide a method of manufacturing a polarizing plate using the polarizing film cutting knife.

According to an exemplary embodiment, a polarizing film cutting knife includes a body portion extending in a first direction, and a knife portion connected to the body portion. The knife portion includes a first surface and a second surface. The first and second surfaces form a first angle. The first angle is about 21.8 to 22.2 degrees.

In an exemplary embodiment, the knife portion may be substantially perpendicular to a polarizing film to be cut.

In an exemplary embodiment, the first and second surfaces may be symmetric with respect to a direction which is substantially perpendicular to the polarizing film.

In an exemplary embodiment, the first angle may be 22 degrees.

In an exemplary embodiment, the knife portion may include carbon steel.

In an exemplary embodiment, the polarizing film cutting knife may further include a coating layer formed on the first and second surfaces of the knife portion. The coating layer may include TEFLON.

According to another exemplary embodiment, a method of manufacturing a polarizing plate includes a preparing process, a cutting process, a testing process and a packaging process. In the preparing process, a polarizing film from a polarizing film roll is unrolled. In the cutting process, polarizing plates are formed by cutting the polarizing film using a polarizing film cutting knife. In the testing process, defective goods among the polarizing plates are sorted out. In the packaging process, the polarizing plates which pass the testing process are stacked to form a bunch of the polarizing plates.

In an exemplary embodiment, the cutting process may include a first cutting process and a second cutting process. In the first cutting process, the polarizing film may be cut in a length direction of the polarizing film using the polarizing film cutting knife. In the second cutting process, the polarizing film may be cut in a width direction of the polarizing film which is substantially perpendicular to the length direction using the polarizing film cutting knife.

In an exemplary embodiment, the polarizing film may have a polarizer direction which is in parallel with the length direction. In the first cutting process, the polarizing film may be cut along a long side of an upper polarizing plate for a display panel or a short side of a lower polarizing plate for the display panel. In the second cutting process, the polarizing film may be cut along a short side of the upper polarizing plate for the display panel or a long side of the lower polarizing plate for the display panel.

In an exemplary embodiment, the packaging process may include a housing process. In the housing process, the bunch of the polarizing plates may be received in a housing element.

In an exemplary embodiment, the packaging process may further include a grinding process before the housing process. In the grinding process, cutting planes of the bunch of the polarizing plates may be grinded to planarize the cutting planes.

In an exemplary embodiment, in the grinding process, only cutting planes which are in parallel with the polarizer direction may be grinded.

In an exemplary embodiment, in the grinding process, only cutting planes which are formed in the first cutting process may be grinded.

In an exemplary embodiment, in the cutting process, the polarizing film cutting knife may cut the polarizing film by pressing the polarizing film in a direction which is substantially perpendicular to the polarizing film.

In an exemplary embodiment, the first and second surfaces may be symmetric with respect to a direction which is substantially perpendicular to the polarizing film. The first angle may be 22 degrees.

In an exemplary embodiment, the knife portion of the polarizing film cutting knife may include carbon steel. The polarizing film cutting knife may further include a coating layer formed on the first and second surfaces of the knife portion, and including TEFLON.

In an exemplary embodiment, the polarizing film cutting knife may be replaced every 30000 times of cutting.

According to one embodiment, a polarizing film cutting knife includes a knife portion which includes a first surface and a second surface forming a first angle in a specific range, so that quality of a cutting plane of a polarizing film may be improved.

In addition, the polarizing film cutting knife further includes a coating layer formed on the first and second surfaces of the knife portion, so that particles attached on a surface of the polarizing film cutting knife may be decreased.

In addition, the polarizing film cutting knife may be changed every 30000 times of cutting, so that cutting quality of the polarizing film cutting knife may be maintained.

In addition, only cutting planes which are perpendicular to a polarizer of the polarizing film are grinded in a grinding process, quality of the cutting planes may be improved and the grinding process may be optimized.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION

Hereinafter, the present disclosure will be provided in more detail with reference to the accompanying drawings.

Figure 1:
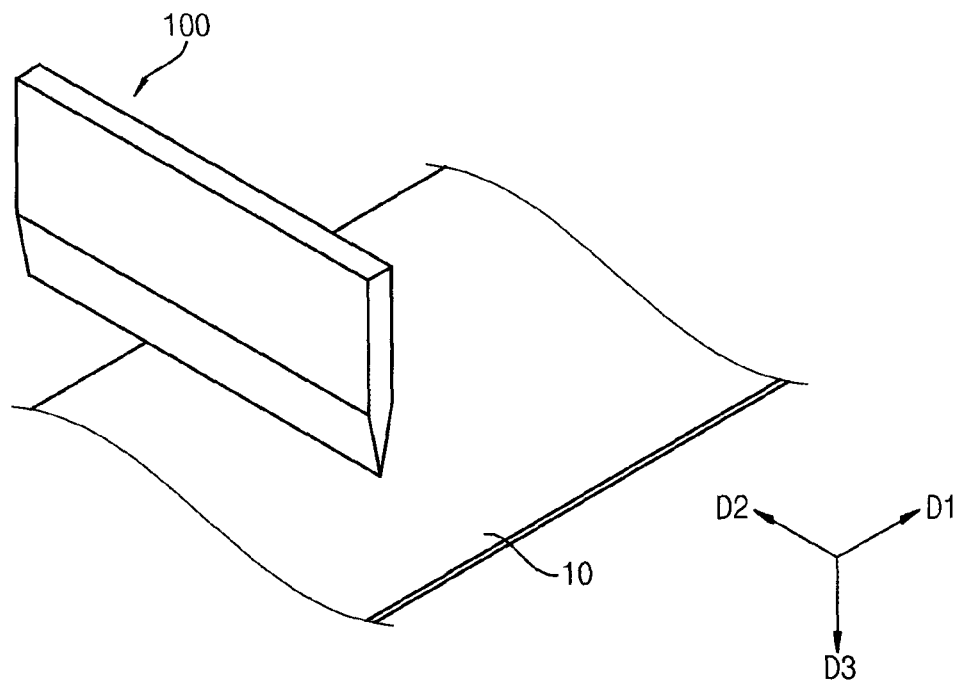
FIG. 1 is a perspective view illustrating a polarizing film cutting knife according to an exemplary embodiment of the present disclosure.
Figure 2:
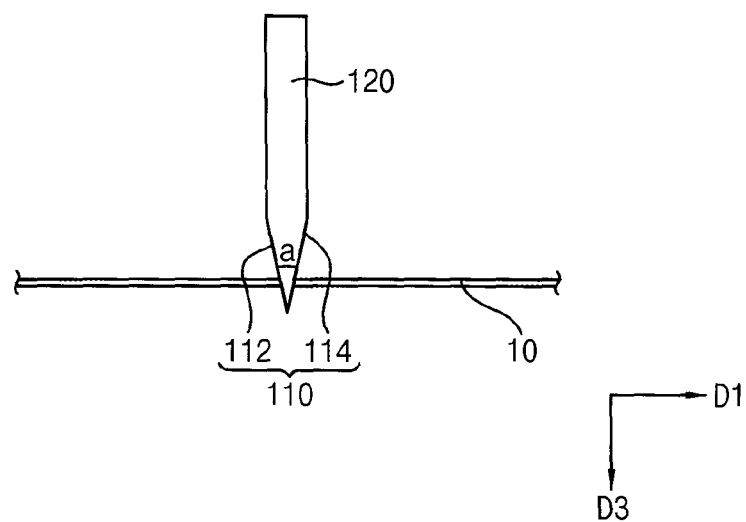
FIG. 2 is a cross-sectional view illustrating cutting of a polarizing film using the polarizing film cutting knife of FIG. 1.

FIG. 1 is a perspective view illustrating a polarizing film cutting knife according to an exemplary embodiment of the present disclosure. FIG. 2 is a cross-sectional view illustrating cutting of a polarizing film using the polarizing film cutting knife of FIG. 1.

Referring to FIGS. 1 and 2, a polarizing film cutting knife 100 includes a knife portion 110 and a body portion 120. the polarizing film cutting knife 100 may cut a polarizing film 10 which extends in a first direction D1 along a second direction D2 which is substantially perpendicular to the first direction D1. The polarizing film cutting knife 100 may cut the polarizing film 10 by pressing the polarizing film 10 in a third direction D3 which is substantially perpendicular to the first and second directions D1 and D2.

The body portion 120 extends in the second direction D2. The body portion 120 is connected to the knife portion 110, and supports the knife portion 110, so that the knife portion 110 may cut the polarizing film 10.

The knife portion 110 is connected to the body portion 120. The knife portion 110 includes a first surface 112 and a second surface 114. The first surface 112 and the second surface 114 form a first angle a. Thus, the polarizing film 10 may be cut by using an edge formed by the first surface 112 and the second surface 114.

The first surface 112 and the second surface 114 may be symmetric with respect to a line which is parallel with the third direction D3 . Quality of a cutting plane of the polarizing film 10 may be influenced by the first angle a.

The polarizing film 10 may be a traditional polarizing film to form upper and lower polarizing plates of a display apparatus. For example, the polarizing film 10 may include a polarizing layer and a tri acetyl cellulose (TAC) layer. Thus, particles on the cutting plane of the polarizing film 10 may deteriorate quality of the cutting plane of the polarizing film 10.

According to an experimental example, when the first angle a was 20 degree, the quality of the cutting plane of the polarizing film 10 was good, but the knife portion 110 was damaged under about 10000 times of cutting. Thus, durability of the knife portion 110 was a problem.

When the first angle a was 22 degrees, the quality of the cutting plane of the polarizing film 10 was good, the durability of the knife portion 110 was more than 30000 times.

When the first angle a was 24 degrees, a bubble problem on the cutting plane of the polarizing film 10 was not shown, but the cutting plane of the polarizing film 10 was rough. The bubble problem means bubbles formed near the cutting plane. A height difference of the cutting plane was about 0.6 to 0.9 mm.

When the first angle a was 26 degrees, a bubble problem on the cutting plane of the polarizing film 10 was shown, and the cutting plane of the polarizing film 10 was rough. A height difference of the cutting plane was about 2.0 to 2.4 mm. (refers to following table 1)

TABLE 1

| first angle a | cutting plane | note |
| --- | --- | --- |
| 20 degrees | good | cutting plane was good durability of the knife was under 10000 times of cutting |
| 22 degrees | good | good |
| 24 degrees | no bubble problem but rough | height difference of the cutting plane was about 0.6 to 0.9 mm |
| 26 degrees | bubble problem and rough | bubble problem height difference of the cutting plane was about 2.0 to 2.4 mm |

Thus, the first angle a may be about 21.8 to 22.2 degrees. The first angle a may preferably be 22 degrees.

In addition, from the experimental example, the polarizing film cutting knife 100 may be changed for maintenance every 30000 times of cutting to keep high quality of the cutting plane.

The knife portion 110 may include metal or ceramic. The knife portion 110 may preferably include carbon steel.

A coating layer (not shown) may be formed on the first surface 110 and the second surface 112 of the knife portion 110. The coating layer may prevent particle formed during a cutting process of the polarizing film 10 from being attached on the first surface 110 and the second surface 112. For example, the coating layer may include polytetrafluoroethylene, e.g., TEFLON.

Although the polarizing film cutting knife 100 cuts the polarizing film 10 along the second direction D2 in the present embodiment, the polarizing film cutting knife 100 may cut the polarizing film 10 along the first direction D1.

Figure 3:
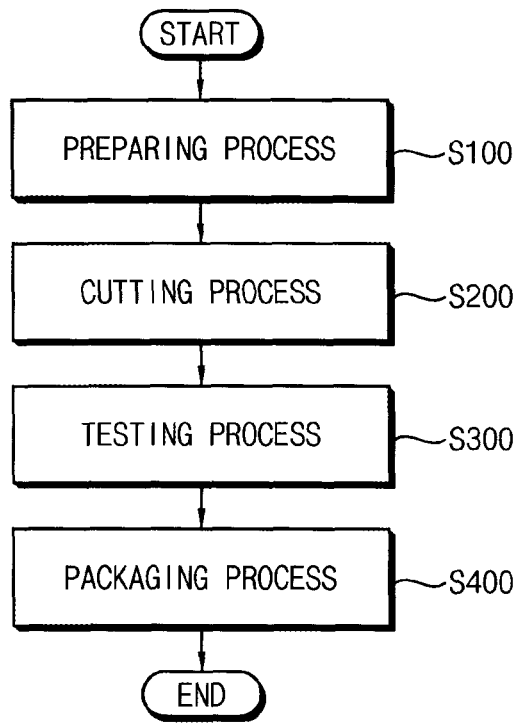
FIG. 3 is a flow chart illustrating a method of manufacturing a polarizing plate according to another exemplary embodiment.

FIG. 3 is a flow chart illustrating a method of manufacturing a polarizing plate according to another exemplary embodiment.

Referring to FIG. 3, a method of manufacturing a polarizing plate includes a preparing process S100, a cutting process S200, a testing process S300 and a packaging process S400.

In the preparing process S100, a polarizing film is unrolled from a polarizing film roll. The polarizing film may be prepared using a traditional conveyer, roll, or belt.

In the cutting process S200 which is after the preparing process S100, a polarizing plate for a display apparatus is formed by cutting the polarizing film. The polarizing film may be cut in a rectangular shape having long sides and short sides using a polarizing film cutting knife of FIG. 1.

At this time, the polarizing film cutting knife includes a body portion and a knife portion. The knife portion includes a first surface and a second surface forming a first angle. The first angle may be about 21.8 to 22.2 degrees. Accordingly, a bubble problem or a roughness problem on a cutting plane of the polarizing film may be decreased.

Figure 4:
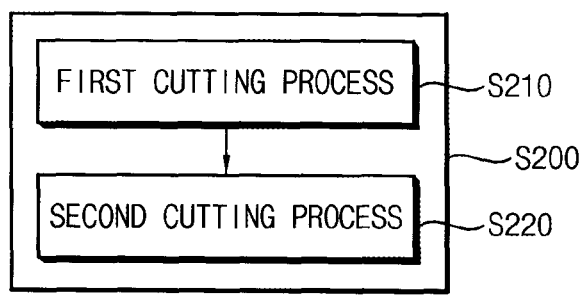
FIG. 4 is a flow chart illustrating a cutting process of the method of FIG. 3 according to an exemplary embodiment.
Figure 7:
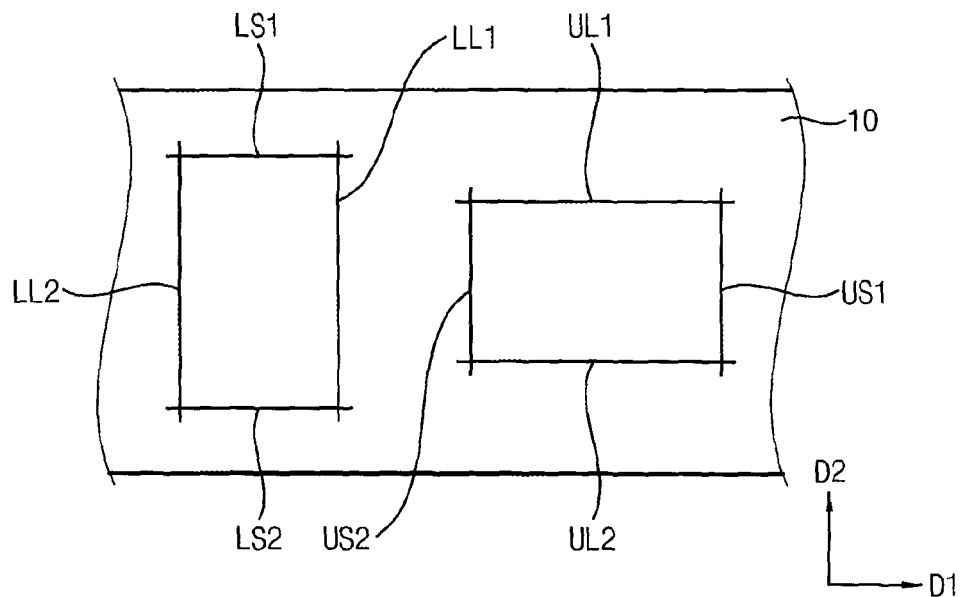
FIG. 7 is a plan view of a polarizing film illustrating a cutting process and a grinding process of a method of manufacturing a polarizing plate according to an exemplary embodiment.
Figure 8:
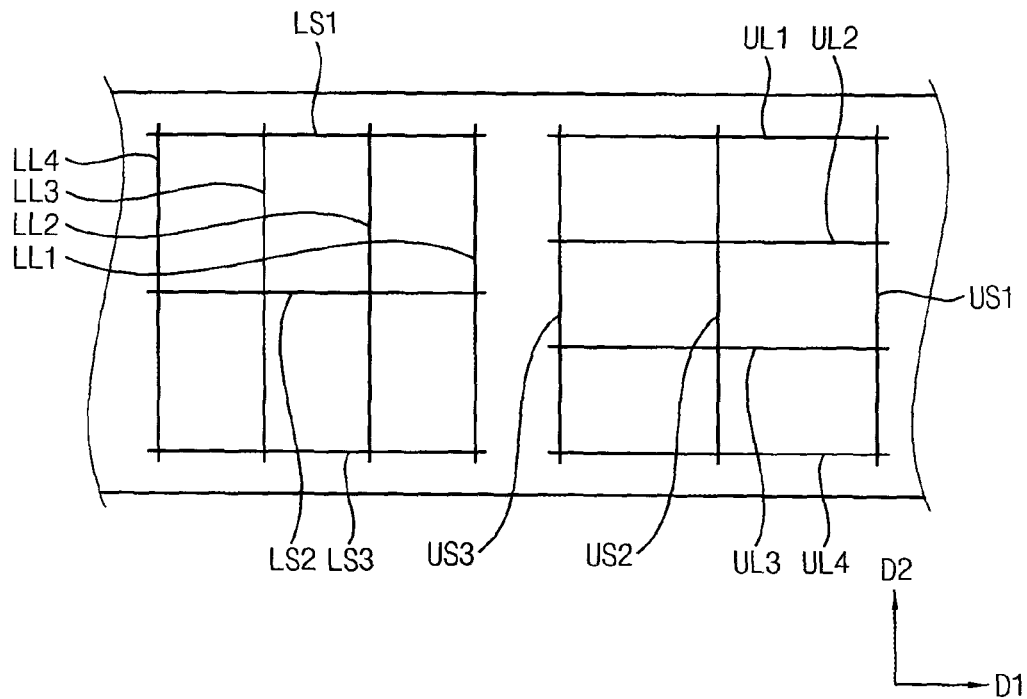
FIG. 8 is a plan view of a polarizing film illustrating a cutting process and a grinding process of a method of manufacturing a polarizing plate according to another exemplary embodiment.

Detailed description of the cutting process S200 will be mentioned in FIGS. 4, 7 and 8.

In the testing process S300 which is after the cutting process S200, the polarizing plate is tested. A worker sorts out defective goods which passes the cutting process S200. The polarizing plate which passes the test may be moved to a next process.

In the packaging process S400 which is after the testing process S300, a plurality of polarizing plates which pass the testing process S300 are stacked to package the polarizing plates. After packaging the polarizing plates, the polarizing plates may be moved to a next process which is for manufacturing a display panel.

Figure 5:
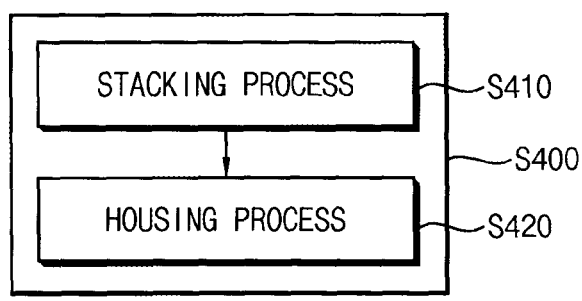
FIG. 5 is a flow chart illustrating a packaging process of the method of FIG. 3 according to an exemplary embodiment.

Detailed description of the packaging process S400 will be mentioned in FIG. 5.

FIG. 4 is a flow chart illustrating the cutting process S200 of the method of FIG. 3 according to an exemplary embodiment.

Referring to FIG. 4, the cutting process S200 of a method of manufacturing a polarizing plate includes a first cutting process S210 and a second cutting process S220.

A polarizing film is cut along a length direction of the polarizing film in the first cutting process S210.

The polarizing film is cut along a width direction of the polarizing film in the second cutting process S220 which is after the first cutting process S210. Thus, a polarizing plate is formed.

The polarizing film may be cut by using a polarizing film cutting knife of FIG. 1 in the first and second cutting process S210 and S220.

At this time, the polarizing film cutting knife includes a body portion and a knife portion. The knife portion includes a first surface and a second surface forming a first angle. The first angle may be about 21.8 to 22.2 degrees. Accordingly, a bubble problem or a roughness problem on a cutting plane of the polarizing film may be decreased.

Detailed description of the first and second cutting process S210 and S220 will be mentioned in FIGS. 7 and 8.

FIG. 5 is a flow chart illustrating the packaging process S400 of the method of FIG. 3 according to an exemplary embodiment.

Referring to FIG. 5, the packaging process S400 of a method of manufacturing a polarizing plate includes a stacking process S410 and a housing process S420.

In the stacking process S410, the polarizing plates which pass the test in the testing process S300 are stacked. About 200 to 400 of the polarizing plates may be stacked and form a bunch of polarizing plates.

In the housing process S420 after the stacking process S410, the bunch of polarizing plates is received in a housing element. Thus, when the polarizing plates are transferred for a next process, the polarizing plates may be safely transferred using the housing element.

Figure 6:
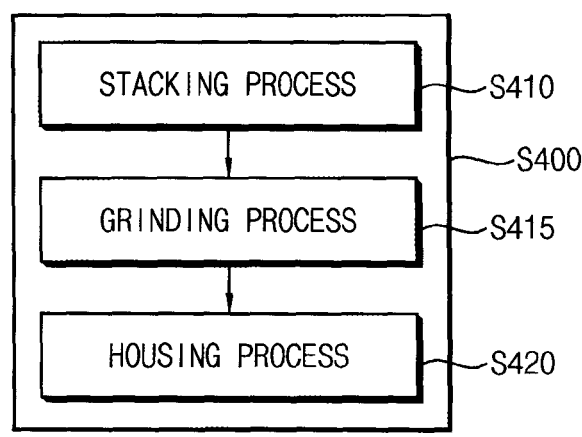
FIG. 6 is a flow chart illustrating a packaging process of the method of FIG. 3 according to another exemplary embodiment.

FIG. 6 is a flow chart illustrating the packaging process S400 of the method of FIG. 3 according to another exemplary embodiment.

Referring to FIG. 6, the packaging process S400 may include a stacking process S410, a grinding process S415 and a housing process S420.

In the stacking process S410, the polarizing plates which pass the test in the testing process S300 are stacked. About 200 to 400 of the polarizing plates may be stacked and form a bunch of polarizing plates.

In the grinding process S415 after the stacking process S410, a portion of cutting planes of the bunch of polarizing plates may be grinded. Thus, some of the cutting planes which have relatively low quality may be grinded, so that quality of the cutting planes may be improved. The grinding process S415 may be performed by a traditional grinder.

Detailed description of the grinding process S415 will be mentioned in FIGS. 7 and 8.

In the housing process S420 after the grinding process S415, the bunch of polarizing plates is received in a housing element. Thus, when the polarizing plates are transferred for a next process, the polarizing plates may be safely transferred using the housing element.

FIG. 7 is a plan view of a polarizing film illustrating a cutting process and a grinding process of a method of manufacturing a polarizing plate according to an exemplary embodiment.

Referring to FIGS. 4 and 7, a polarizing plate 10 is cut from a polarizing film roll in a cutting process S200 of a method of manufacturing a polarizing plate.

The polarizing film 10 extends in a first direction D1 and has a width in a second direction D2 which is perpendicular to the first direction D1. A polarizer direction of the polarizing film 10 may be in parallel with the first direction D1.

In a first cutting process S210, the polarizing film 10 is cut along the first direction D1 using a polarizing film cutting knife of FIG. 1. For forming an upper polarizing plate of a display panel, the polarizing film 10 may be cut along a first long side UL1 and a second long side UL2 which are in parallel with the first direction D1.

In addition, for forming a lower polarizing plate of the display panel, the polarizing film 10 may be cut along a first short side LS1 and a second short side LS2 which are in parallel with the first direction D1.

In a second cutting process S220, the polarizing film 10 is cut along the second direction D2 using the polarizing film cutting knife. For forming the upper polarizing plate of a display panel, the polarizing film 10 may be cut along a first short side US1 and a second short side US2 which are in parallel with the second direction D2.

In addition, for forming the lower polarizing plate of the display panel, the polarizing film 10 may be cut along a first long side LL1 and a second long side LL2 which are in parallel with the second direction D2.

Referring to FIGS. 6 and 7, portions of cutting planes of the upper and lower polarizing plates are grinded in a grinding process S415 of the method of manufacturing the polarizing plate.

The polarizer direction of the polarizing film 10 may be in parallel with the first direction D1. The first and second long sides UL1 and UL2 of the upper polarizing plate may be in parallel with polarizer direction of the polarizing film 10. In this case, quality of the cutting plane along the first and second long sides UL1 and UL2 may be lower than quality of the cutting plane along the first and second short sides US1 and US2 of the upper polarizing plate which are perpendicular to the polarizer direction.

Thus, only the first and second long sides UL1 and UL2 of the upper polarizing plate are grinded without grinding the first and second short sides US1 and US2, so that the grinding process S415 may be optimized.

In addition, the first and second short sides LS1 and LS2 of the lower polarizing plate may be in parallel with the polarizer direction of the polarizing film 10. In this case, quality of the cutting plane along the first and second short sides LS1 and LS2 may be lower than quality of the cutting plane along the first and second long sides LL1 and LL2 of the lower polarizing plate which are perpendicular to the polarizer direction.

Thus, only the first and second short sides LS1 and LS2 of the upper polarizing plate are grinded without grinding the first and second long sides LL1 and LL2, so that the grinding process S415 may be optimized.

FIG. 8 is a plan view of a polarizing film illustrating a cutting process and a grinding process of a method of manufacturing a polarizing plate according to another exemplary embodiment. The cutting process and the grinding process is substantially same as a cutting process and a grinding process of FIG. 7 except for cutting a plurality of polarizing plate along a width direction of the polarizing plate. Thus, any further detailed descriptions concerning the same elements will be briefly described or omitted.

Referring to FIGS. 4 and 8, a polarizing plate 10 is cut from a polarizing film roll in a cutting process S200 of a method of manufacturing a polarizing plate.

The polarizing film 10 extends in a first direction D1 and has a width in a second direction D2 which is perpendicular to the first direction D1. A polarizer direction of the polarizing film 10 may be in parallel with the first direction D1.

In a first cutting process S210, the polarizing film 10 is cut along the first direction D1 using a polarizing film cutting knife of FIG. 1. For forming an upper polarizing plate of a display panel, the polarizing film 10 may be cut along a first long side UL1, a second long side UL2, a third long side UL3 and a fourth long side UL4 which are in parallel with the first direction D1.

In addition, for forming a lower polarizing plate of the display panel, the polarizing film 10 may be cut along a first short side LS1, a second short side LS2 and a third short side LS3 which are in parallel with the first direction D1.

In a second cutting process S220, the polarizing film 10 is cut along the second direction D2 using the polarizing film cutting knife. For forming the upper polarizing plate of a display panel, the polarizing film 10 may be cut along a first short side US1, a second short side US2 and a third short side US3 which are in parallel with the second direction D2.

In addition, for forming the lower polarizing plate of the display panel, the polarizing film 10 may be cut along a first long side LL1, a second long side LL2, a third long side LL3 and a fourth long side LL4 which are in parallel with the second direction D2.

Referring to FIGS. 6 and 8, portions of cutting planes of the upper and lower polarizing plates are grinded in a grinding process S415 of the method of manufacturing the polarizing plate.

The polarizer direction of the polarizing film 10 may be in parallel with the first direction D1. The first to fourth long sides UL1 to UL4 of the upper polarizing plate may be in parallel with polarizer direction of the polarizing film 10. In this case, quality of the cutting plane along the first to fourth long sides UL1 to UL4 may be lower than quality of the cutting plane along the first to third short sides US1 to US3 of the upper polarizing plate which are perpendicular to the polarizer direction.

Thus, only the first to fourth sides UL1 to UL4 of the upper polarizing plate are grinded without grinding the first to third short sides US1 to US3, so that the grinding process S415 may be optimized.

In addition, the first to third short sides LS1 to LS3 of the lower polarizing plate may be in parallel with the polarizer direction of the polarizing film 10. In this case, quality of the cutting plane along the first to third short sides LS1 to LS3 may be lower than quality of the cutting plane along the first to fourth long sides LL1 to LL4 of the lower polarizing plate which are perpendicular to the polarizer direction.

Thus, only the first to third short sides LS1 to LS3 of the upper polarizing plate are grinded without grinding the first to fourth long sides LL1 to LL4, so that the grinding process S415 may be optimized.

According to one embodiment, a polarizing film cutting knife includes a knife portion which includes a first surface and a second surface forming a first angle in a specific range, so that quality of a cutting plane of a polarizing film may be improved.

In addition, the polarizing film cutting knife further includes a coating layer formed on the first and second surfaces of the knife portion, so that particles attached on a surface of the polarizing film cutting knife may be decreased.

In addition, the polarizing film cutting knife may be changed every 30000 times of cutting, so that cutting quality of the polarizing film cutting knife may be maintained.

In addition, only cutting planes which are perpendicular to a polarizer of the polarizing film are grinded in a grinding process, quality of the cutting planes may be improved and the grinding process may be optimized.

The foregoing is illustrative of the inventive concept and is not to be construed as limiting thereof. Although a few exemplary embodiments have been described, those skilled in the art will readily appreciate that many modifications are possible in the exemplary embodiments without materially departing from the novel teachings and advantages thereof. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A method of manufacturing a polarizing plate comprising:
    unrolling a polarizing film from a polarizing film roll in a preparing process;
    forming polarizing plates by cutting the polarizing film using a polarizing film cutting knife in a cutting process;
    sorting out defective goods among the polarizing plates in a testing process; and
    stacking the polarizing plates which pass the testing process to form a bunch of the polarizing plates in a packaging process which comprises a grinding process, wherein in the grinding process:
        cutting planes of the bunch of the polarizing plates are grinded to planarize the cutting planes, and
        only cutting planes which are in parallel with a polarizer direction of the polarizing film are grinded, wherein the polarizer direction is in parallel with a length direction of the polarizing film;
    wherein the polarizing film cutting knife comprises a body portion extending in a first direction, and a knife portion connected to the body portion and comprising a first surface and a second surface, the first and second surface forms a first angle, and
    the first angle is about 21.8 to 22.2 degrees.

2. The method of claim 1, wherein the cutting process comprises a first cutting process and a second cutting process,
    in the first cutting process, the polarizing film is cut in the length direction of the polarizing film using the polarizing film cutting knife, and
    in the second cutting process, the polarizing film is cut in a width direction of the polarizing film which is substantially perpendicular to the length direction using the polarizing film cutting knife.

3. The method of claim 2,
    in the first cutting process, the polarizing film is cut along a long side of an upper polarizing plate for a display panel or a short side of a lower polarizing plate for the display panel, and
    in the second cutting process, the polarizing film is cut along a short side of the upper polarizing plate for the display panel or a long side of the lower polarizing plate for the display panel.

4. The method of claim 3, wherein the packaging process comprises a housing process,
    in the housing process, the bunch of the polarizing plates is received in a housing element.

5. The method of claim 4, wherein the grinding process is before the housing process.

6. The method of claim 5, wherein in the grinding process, only cutting planes which are formed in the first cutting process are grinded.

7. The method of claim 1, wherein in the cutting process, the polarizing film cutting knife cuts the polarizing film by pressing the polarizing film in a direction which is substantially perpendicular to the polarizing film.

8. The method of claim 1, wherein the first and second surfaces are symmetric with respect to a direction which is substantially perpendicular to the polarizing film, and
    the first angle is 22 degrees.

9. The method of claim 8, wherein the knife portion of the polarizing film cutting knife comprises carbon steel, and
    the polarizing film cutting knife further comprises a coating layer formed on the first and second surfaces of the knife portion, the coating layer comprising polytetrafluoroethylene.

10. The method of claim 1, wherein the polarizing film cutting knife is replaced every 30,000 times of cutting.

* * * * *